United States Patent [19]

Thiel et al.

[11] Patent Number: 5,048,645
[45] Date of Patent: Sep. 17, 1991

[54] WEAR INDICATOR FOR A BRAKE SHOE, ESPECIALLY A DISC-TYPE BRAKE SHOE, OF AN AUTOMOTIVE VEHICLE

[75] Inventors: Rudolf Thiel, Frankfurt am Main; Ulrich Klimt, Gross-Umstadt; Reiner Mueller, Hattersheim; Christoph Veith, Kronberg, all of Fed. Rep. of Germany

[73] Assignee: Alfred Teves GmbH, Frankfurt am Main, Fed. Rep. of Germany

[21] Appl. No.: 532,002

[22] Filed: Jun. 1, 1990

[30] Foreign Application Priority Data

Jun. 1, 1989 [DE] Fed. Rep. of Germany ....... 3917854

[51] Int. Cl.⁵ ............................................. F16D 66/02
[52] U.S. Cl. .................................... 88/1.11; 116/208; 188/73.38; 192/30 W; 340/454
[58] Field of Search ........................... 188/1.11, 73.38; 192/30 W; 116/208; 340/454

[56] References Cited

U.S. PATENT DOCUMENTS 3,783,979  1/1974  Hess ................................... 188/1.11
4,527,669  7/1985  Meyer et al. ..................... 188/73.38
4,643,277  2/1987  Bangert ......................... 188/73.38 X

FOREIGN PATENT DOCUMENTS 2813244 10/1978 Fed. Rep. of Germany ..... 188/1.11
3233634  4/1983 Fed. Rep. of Germany .
3220632  8/1983 Fed. Rep. of Germany .
3508066  9/1986 Fed. Rep. of Germany ... 188/73.38
2107013  4/1983 United Kingdom ............... 188/1.11

*Primary Examiner*—George E. A. Halvosa
*Attorney, Agent, or Firm*—Robert P. Seitter; J. Gordon Lewis

[57] ABSTRACT

A re-usable wear indicator (14) detachably secured to the pad carrier plate (2), especially intended for a disc-type brake shoe (1), which is located at the same point as is a spring (8) precluding rattling from occurring. This measure enables a recess (4) in the brake pad (3), required for fixing the spring, to be used, at the same time, to accommodate the wear indicator (14). The fixation is with the aid of a snap or O-ring (20) secured in an annular groove (19) on an extension (17) of the wear indicator (14), which ring (20) undergrips the constricted first end (21) of a hollow clip (22).

10 Claims, 1 Drawing Sheet

5,048,645

WEAR INDICATOR FOR A BRAKE SHOE, ESPECIALLY A DISC-TYPE BRAKE SHOE, OF AN AUTOMOTIVE VEHICLE

TECHNICAL FIELD

The present invention is concerned with a wear indicator for a brake shoe, especially a disc-type brake shoe, of an automotive vehicle, having a heat-resistant and electrically-insulating member in which is embedded an electrical loop-type conductor. The heat-resistant and electrically-insulating member has an extension for fixation purposes. One of the back faces of the heat-resistant and electrically-insulating member is directly supported on a pad carrier plate. A snap or 0-ring is located in an annular groove on the extension of the heat-resistant and electrically-insulating member to hold it in axial relationship to the pad carrier plate.

BACKGROUND OF THE INVENTION

The prior art suggests a wear indicator of the afore-described type which, however, has the disadvantage that fixation thereof requires a complex handling of the pad carrier plate, such as provision of a conically shaped bore expansion of a predetermined depth.

Also, German Patent No. 32 33 634 discloses a similar type of wear indicator which, however, is not fixed to the pad carrier plate but rather to a hollow rivet inserted thereinto and on which it is, at the same time, supported. Consequently, an additional structural component allowing for tolerances and an additional operation (rivets) are required for fixation purposes. Moreover, according to the above Patent Specification, the extension is formed by a part separately fixed to the body, involving substantial and costly mounting efforts.

SUMMARY OF THE INVENTION

It is, therefore, the object of the present invention to provide a wear indicator for a brake shoe that is easy and inexpensive to manufacture, permitting re-use of a still useable wear indicator along with a new brake shoe if, for example, a brake shoe exchange is effected shortly before the wear limit is reached.

This object is achieved by a wear indicator which is fixed to the same spot of the pad back plate as is the spring precluding the brake shoe from rattling once the brake is released. Fixation of the wear indicator to the aforementioned spot is also suggested by DE-OS 32 20 632.1. However, this reference does not describe the way in which such a fixation is effected.

According to an advantageous embodiment of the present invention, the recess and the opening are given a U-shaped configuration so that the latter is open toward the rim of the pad carrier plate. This measure enables a particularly inexpensive manufacture of recess and opening directly during molding of the pad carrier plate without involving any extra mechanical efforts.

Advantageously, the collar of the hollow clip in abutment with the projection is of a spherical configuration, which is particularly simple to manufacture. However, it also is possible to flatten the collar, in which case problems with the connection of the two spring loops are avoided, with the hollow clip being, at the same time, locked against twisting.

One preferred embodiment of the present invention will be described hereinafter with reference to the enclosed drawing.

DETAILED DESCRIPTION OF THE INVENTION

Figure 1:
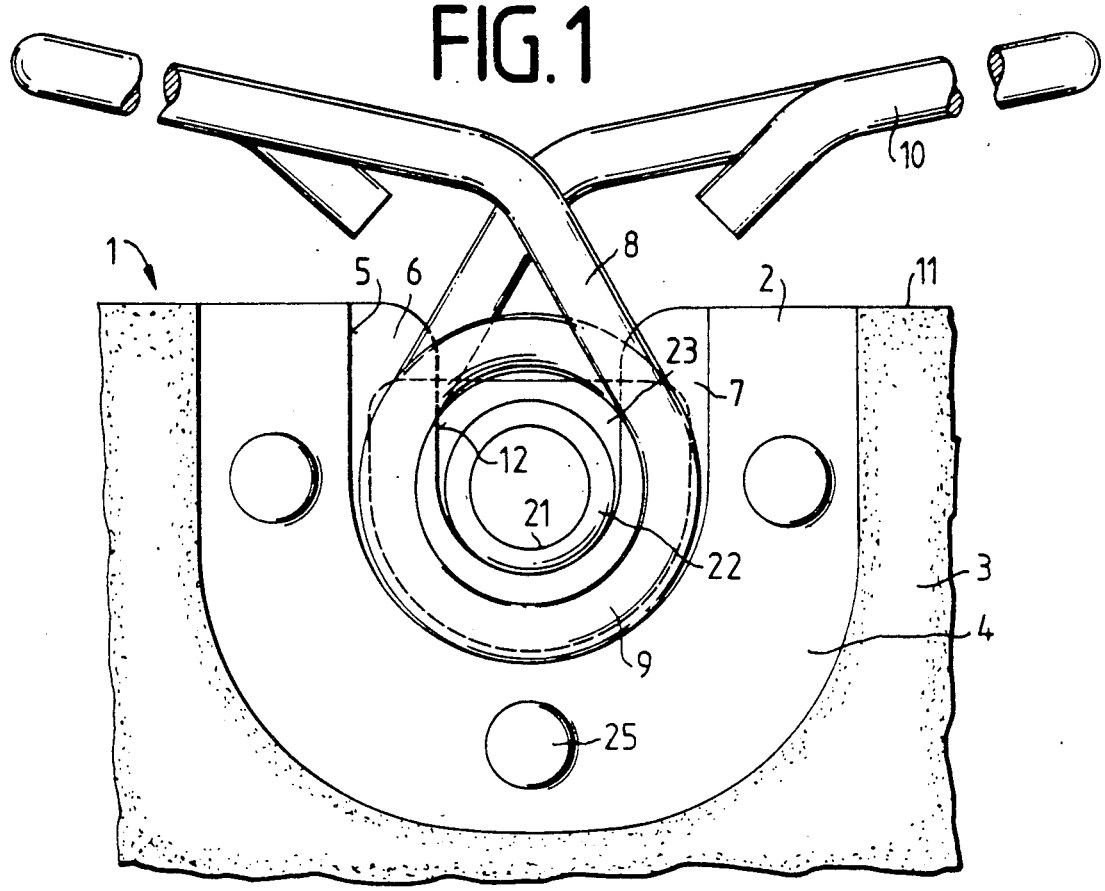
FIG. 1 is a partial view of a brake shoe provided with wear indicator and spring according to the present invention.

A number of concealed details are shown in FIG. 1 in broken lines. Identical parts in both figures have the same reference numerals.

The drawing shows a brake shoe 1 provided with a pad carrier plate 2 and brake pad 3, the latter having a recess 4 such that a part of the pad carrier plate 2 is not covered by the brake lining 3. Located within the recess 4 is a U-shaped recess 5 of the pad carrier plate 2, with a bridge 6 protruding into the recess 5 to form a projection 7 disposed in the central plane of the pad carrier plate 2. Projection 7, is of a U-shaped configuration. Plugged onto the projection 7 is a spring 8 having two loops 9. The loops 9 are located on either side of the projection 7, with the thickness of the projection 7 and of the two loops 9 taken together not exceeding the thickness of the pad carrier plate 2 at the points not provided with recesses. The spring 8 has two spring legs 10 extending substantially in parallel to the upper edge 11 of the brake shoe 1. Formed by projection 7 in concentric relationship to the loops 9 of the plugged-on spring 8 is an aperture 12. The aperture 12 is shaped to form a U thus being open toward the upper edge 11. Aperture 12, recess 5, projection 7 and loops 9 are within the cross-section of the body portion 13 of a wear indicator 14. The wear indicator 14 fills almost the whole of the recess 4 and, in the circumferential direction, is broader than the recess 5. With a part of the back face 15 of the body portion 13, it is in abutment with embossings 25 of the pad carrier plate 2. Embedded in the body portion 13 of insulating and refractory material is a loop-type conductor 16. Two conductor ends protrude out of the upper part of body portion 13 and are connected with a warning device (not shown). The course of the loop-type conductor 16 within the body portion 13 is shown in broken lines. Once the brake pad 3 is worn down to a high degree, a brake disc (not shown) will first grind off the surface of the body portion 13 to virtually contact the loop-type conductor 16, thereby closing a circuit and causing, for example, the warning lamp to flash. As the body portion 13 is in direct abutment with the pad carrier plate 2 and the embossings 25, respectively, the response time will be exclusively determined by the depth by which the loop-type conductor 16 is embedded into the body portion 13.

Figure 2:
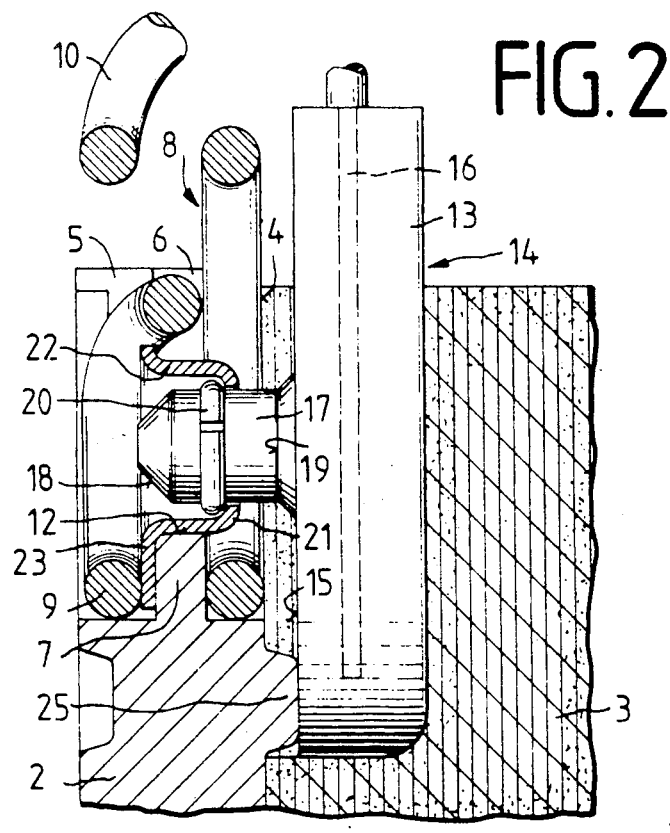
FIG. 2 is a sectional view of the embodiment of the present invention shown in FIG. 1.

FIG. 2 shows a sectional view of the aforedescribed embodiment, with the extension 17 being shown on the body portion 13 of the wear indicator 14. The extension 17, on the one end thereof, is provided with a bevel 18 for the ease of mounting, as well as an annular groove 19 in which is located a snap ring 20. The snap ring 20 not only is supported in the annular groove 19 but also on the constricted first end 21 of the hollow clip 22 pushed into the aperture 12 from the side facing away from the brake pad 3. Hollow clip 22 can be an extruded, deep-drawn or sintered part or a molded part of plastic material. The outer diameter of the hollow clip 22 is slightly smaller than the inner diameter of the aperture 12, while the inside diameter thereof is slightly larger than the outside diameter of the extension 17. The other end of the hollow clip 22 is expanded to form a collar 23, thereby forming a flat disc by which the hollow clip 22 is supported on the projection 7 in the axial direction. This measure will prevent the hollow clip 22 from slipping through the aperture 12 so that the wear indicator 14 is axially secured to the pad carrier plate 2.

Assembly is effected in that the hollow clip 22 is first pushed into the spring 8 which is subsequently plugged from the top on projection 7, thereby causing the hollow clip 22 and the spring 8, during installation, to be safely secured to the brake shoe 1. Subsequently, the wear indicator 14 is introduced into the aperture 12, with the snap ring 20 being located in the annular groove 19 on the extension 17. The bevel 18 will facilitate the mounting operation; the snap ring 20 is slightly compressed to be re-expanded once it has passed the constriction, thereby undergripping the first end 21 to support itself on the oblique bearing face 24, and to hold the wear indicator 14. For releasing purposes, the wear indicator 14 will be withdrawn. Once all parts are intact, they can be remounted on a new pad.

Conversely, the firm though detachable fixation also permits the supply to the customer of brake shoes 1 with springs 8, wear indicators 14 and hollow clips 22, respectively, pre-assembled, meaning that fewer separate parts need to be transported, thereby attaining a substantial cost-saving effect.

What is claimed is:

1. An automotive brake shoe having a wear indicator comprising:
   a carrier plate having a recess and an aperture within said recess formed by a projection extending along a selected length of said recess;
   a brake pad mounted on a face of said carrier plate and having a recess extending radially beyond said recess in said carrier plate to expose a portion of said face of said carrier plate;
   a heat-resistant and electrically-insulating member having:
      (a) a body portion fitted within said recess in said brake pad and supported on said carrier plate, and
      (b) an axial extension, with an annular groove in said extension, extending into said aperture in said carrier plate;
   an electrical conductor embedded in said body portion of said heat-resistant and electrically-insulating member;
   a radially compressible snap ring fitted within said annular groove in said axial extension of said heat-resistant and electrically-insulating member;
   a hollow clip extending through said aperture of said carrier plate and:
      (a) mounted on said axial extension of said heat-resistant and electrically-insulating member by a constricted first end of said hollow clip disposed between said snap ring and said body portion of said heat-resistant and electrically-insulating member, and
      (b) mounted on said projection of said carrier plate by an intermediate section of said hollow clip and an expanded second end of said hollow clip;
   and a coil spring mounted on said projection of said carrier plate having a first loop directly bearing against said second end of said hollow clip to urge said hollow clip against said projection in said aperture of said carrier plate.

2. An automotive brake shoe having a wear indicator according to claim 1 wherein said coil spring has a second loop disposed between said projection of said carrier plate and said body portion of said heat-resistant and electrically-insulating member.

3. An automotive brake shoe having a wear indicator according to claim 2 wherein said projection of said carrier plate is located at the mid-point of the axial length of said recess in said carrier plate.

4. An automotive brake shoe having a wear indicator according to claim 3 wherein said recess in said carrier plate has a U-shape configuration and said aperture in said carrier plate is open toward the upper edge of said carrier plate.

5. An automotive brake shoe having a wear indicator according to claim 4 wherein said hollow clip is an extruded part.

6. An automotive brake shoe having a wear indicator according to claim 4 wherein said hollow clip is a deep-drawn part.

7. An automotive brake shoe having a wear indicator according to claim 4 wherein said hollow clip is a molded part of plastic material.

8. An automotive brake shoe having a wear indicator according to claim 4 wherein said hollow clip is a sintered part.

9. An automotive brake shoe having a wear indicator according to claim 1 wherein said carrier plate further includes a plurality of embossings on which said body portion of said heat-resistant and electrically-insulating member is supported.

10. An automotive brake shoe having a wear indicator according to claim 9 wherein said expanded second end of said hollow clip has a circular configuration.

* * * * *